United States Patent Office 3,331,844
Patented July 18, 1967

3,331,844
BASIC 5-DIBENZO[a,d]CYCLOHEPTENYL SULFONES AND SALTS THEREOF
Martin A. Davis, Montreal, Quebec, Canada, assignor to American Home Products Corporation, New York, N.Y., a corporation of Delaware
No Drawing. Filed Sept. 14, 1965, Ser. No. 487,302
5 Claims. (Cl. 260—268)

The present invention relates to novel chemical compounds having useful biological activities. In particular, this invention relates to 5H-dibenzo[a,d]cycloheptenyl β-(substituted amino)ethyl sulfones of the following generic formula:

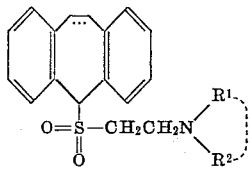

in which $R^1$ and $R^2$ represents hydrogen or lower alkyl groups of from 1 to 3 carbon atoms which may also be linked with each other, either directly or through another hetero atom which in turn may carry a lower alkyl substituent.

The compounds of this invention and their pharmacologically acceptable salts show trichomonicidal activity and are useful as trichomonocidal agents, especially against *T. vaginalis* and *T. foetus*. As trichomonicidal agents, the compounds of this invention may be formulated with suitable excipients in the form of vaginal suppositories or vaginal inserts containing from 10 mg. to 100 mg. of the active ingredients, and may be administered twice daily for periods of time of from two to several weeks.

The compounds of this invention may be prepared by a general method described by R. Kuhn and F. A. Neugebauer in Chem. Ber., vol. 94, p. 2629 (1961) for preparation of benzhydryl β-piperidinoethyl sulfone. A mixture of a spiro {5H-dibenzo[a,d]cycloheptene-5,2'-(1',3'-dithiolane)}-1',1',3',3'-tetroxide and an appropriate amine, either alone or in an appropriate solvent such as, for example, dry dioxane or toluene, is heated at an elevated temperature of from 90° to 140° C. for periods of time of from one to three hours. The solvent, if present is removed by evaporation and the residue is stirred with water in order to remove water-soluble by-products and the product is isolated by filtration.

The above cleavage of a spiro {5H-dibenzo[a,d]cycloheptene-5,2'-(1',3' - dithiolane)} - 1',1',3',3'-tetroxide appears to be the most advantageous route to the compounds of this invention. Although it is known that the corresponding benzhydryl sulfones may be prepared in the conventional manner by condensing benzhydrylmercaptan with a β-haloethylamine, the related 10,11-dihydro-5-mercapto-5H-dibenzo[a,d]cycloheptene could not be prepared (V. Mychajlyszyn and M. Protiva, Coll. Czech. Chem. Commun., vol. 24, p. 3955 (1959)).

The following formulae and examples will illustrate my invention.

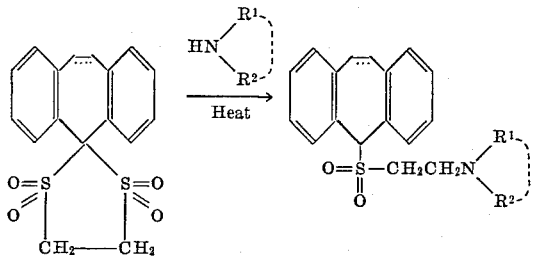

EXAMPLE 1

*5[(2-dimethylaminoethyl)sulfonyl]10,11-dihydro-5H-dibenzo[a,d]-cycloheptene*

A mixture of spiro {10,11-dihydro-5H-dibenzo[a,d]cycloheptene-5,2'-(1',3'-dithiolane)-1',1',3',3' - tetroxide, prepared as described in my co-pending U.S. patent application S.N. 487,325, filed September 14, 1965 (7.7 g., 0.02 mole) and an excess of dimethylamine in dry dioxane (50 ml.) is heated in a bomb at 100° for one hour. The solvent is then removed in vacuo to give a yellow oil which crystallizes on trituration with water. The precipitated product is thoroughly washed with water, taken up in dichloromethane and the organic layer dried over sodium sulphate. Removal of the solvent in vacuo gives the title compound with M.P. 106–111° which is recrystallized from 2-propanol to M.P. 117–119°. Elemental analysis confirms its composition.

EXAMPLE 2

*5[(2-dimethylaminoethyl)sulfonyl]5H-dibenzo[a,d] cycloheptene HCl*

A mixture of spiro {5H-dibenzo[a,d]cycloheptene-5,2'-(1',3' - dithiolane)}1',1',3',3' - tetroxide, prepared as described in my U.S. patent application cited above (7.6 g., 0.02 mole), and dry dioxane (125 ml.) saturated with dimethylamine is heated in a bomb at 100° for one hour. The solvent is then removed in vacuo to give a yellow solid which is thoroughly washed with water, taken up in ethylene dichloride and the solution dried over sodium sulphate. Evaporation gives a pale-yellow solid, M.P. 143–147°. Recrystallization from ethyl acetate yields the title compound as white plates M.P. 148–150°, and elemental analysis confirms its composition.

The above base is converted to its hydrochloride salt in dichloromethane to give white needles, M.P. 205–207° (dec.). Recrystallization from ethanol yields the hydrochloride salt, M.P. 205–207° (dec.).

EXAMPLE 3

*5-[(2-piperidinoethyl)sulfonyl]5H-dibenzo[a,d] cycloheptene*

Spiro {5H-dibenzo[a,d]cycloheptene-5,2'-(1',3'-dithiolane)}1',1',3',3'-tetroxide, (10 g., 0.03 mole) is heated under reflux in piperidine (75 ml.) for one hour and the solution is processed as indicated above to give a pale-yellow solid, M.P. 176–180°. Recrystallization from ethyl acetate gives the title compound as white needles, M.P. 181–183°, and elemental analysis confirms its composition.

EXAMPLE 4

*5-[(2-N'-methylpiperazinoethyl)sulfonyl]5H-dibenzo [a,d]cycloheptene*

Spiro {5H-dibenzo[a,d]cycloheptene-5,2'-(1',3'-dithiolane)}1',1',3',3'-tetroxide, (6 g., 0.02 mole) is heated in the steam-bath in toluene (50 ml.) with N-methylpiperazine (20 ml.) for two hours. The solvent as removed in vacuo and the residue stirred with water. The yellow product is thoroughly washed with water and then dissolved in dichloromethane. The organic layer is dried and the solvent then removed under reduced pressure to furnish a pale-pellow solid M.P. 174–178° (dec.). Recrystallization from acetonitrile gives the title compound as white needles M.P. 183–185° (dec.), and its composition is confirmed by elemental analysis.

I claim:
1. 5[(2-dimethylaminoethyl)sulfonyl]10,11-dihydro-5H-dibenzo[a,d]-cycloheptene.

2. 5[(2-dimethylaminoethyl)sulfonyl]5H-dibenzo[a,d]cycloheptene.

3. The hydrochloride salt of 5[(2-dimethylaminoethyl)sulfonyl]5H-dibenzo[a,d]cycloheptene.

4. 5-[(2-piperidinoethyl)sulfonyl]5H-dibenzo[a,d]cycloheptene.

5. 5-[(2-N'-methyliperazinoethyl)sulfonyl]5H-dibenzo[a,d]cycloheptene.

No references cited.

ALEX MAZEL, *Primary Examiner.*
HENRY R. JILES, *Assistant Examiner.*